United States Patent
Kauth (10) Patent No.: US 9,898,877 B2
(45) Date of Patent: Feb. 20, 2018

(54) APPARATUS AND METHOD FOR OPERATING SAME

(71) Applicant: Robert Bosch GmbH, Stuttgart (DE)

(72) Inventor: Christoph Kauth, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 14/847,032

(22) Filed: Sep. 8, 2015

(65) Prior Publication Data

US 2016/0071340 A1   Mar. 10, 2016

(30) Foreign Application Priority Data

Sep. 8, 2014  (DE) .................. 10 2014 217 865

(51) Int. Cl.

| | | |
|---|---|---|
| G05B 19/00 | (2006.01) | |
| G05B 19/418 | (2006.01) | |
| G05B 23/00 | (2006.01) | |
| G06F 7/04 | (2006.01) | |
| G06F 21/00 | (2013.01) | |
| G06K 9/00 | (2006.01) | |
| G06K 1/00 | (2006.01) | |
| G07C 9/00 | (2006.01) | |
| H04W 4/00 | (2018.01) | |

(52) U.S. Cl.
CPC ........ *G07C 9/00007* (2013.01); *H04W 4/008* (2013.01)

(58) Field of Classification Search
CPC .................................................. G07C 9/00007
USPC .................. 340/5.2, 10.1–10.6, 572.1–572.9
See application file for complete search history.

(56) References Cited

U.S. PATENT DOCUMENTS

| | | | | |
|---|---|---|---|---|
| 7,181,620 B1* | 2/2007 | Hur | ......................... | H04L 9/083 713/168 |
| 2003/0041268 A1* | 2/2003 | Hashimoto | ............. | G06F 21/31 726/4 |
| 2005/0128083 A1* | 6/2005 | Puzio | ...................... | G08B 13/14 340/572.1 |
| 2007/0001852 A1* | 1/2007 | Jalkanen | ................. | G06F 21/34 340/572.1 |
| 2009/0072502 A1* | 3/2009 | Weller | ................... | B23B 31/207 279/63 |
| 2009/0079537 A1* | 3/2009 | Seitz | ..................... | G05B 19/406 340/5.2 |
| 2009/0088077 A1* | 4/2009 | Brown | ..................... | H04B 5/02 455/41.2 |
| 2009/0128356 A1* | 5/2009 | Nitta | .................. | G07C 9/00896 340/4.36 |
| 2009/0303013 A1* | 12/2009 | Edgerton | ............. | G06K 7/0008 340/10.1 |

(Continued)

*Primary Examiner* — Kerri McNally
*Assistant Examiner* — Thang Tran
(74) *Attorney, Agent, or Firm* — Maginot, Moore & Beck LLP (57) ABSTRACT

An apparatus and a method for using an apparatus are provided, which apparatus can be used in particular in an industrial automation process. The apparatus comprises a machine part for performing a process to be performed by an automation system or for processing a workpiece, and an authentication and access part for authenticating a user of the apparatus and for permitting the user access to at least some of the functions of the machine part if the user has been authenticated, and for blocking the user access to the functions of the machine part if the user has not been authenticated.

8 Claims, 6 Drawing Sheets

(56) References Cited

U.S. PATENT DOCUMENTS

| | | | | |
|---|---|---|---|---|
| 2010/0063652 A1* | 3/2010 | Anderson | .......... | A61B 5/02438 |
| | | | | 701/2 |
| 2011/0181396 A1* | 7/2011 | Hilla, Jr. | ................. | G06F 21/35 |
| | | | | 340/10.1 |
| 2011/0248821 A1* | 10/2011 | Merten | .................... | H04Q 9/00 |
| | | | | 340/5.74 |
| 2012/0286939 A1* | 11/2012 | Cote | ...................... | G06Q 10/08 |
| | | | | 340/10.6 |
| 2012/0290336 A1* | 11/2012 | Rosenblatt | ............. | G06Q 30/02 |
| | | | | 705/5 |
| 2014/0108149 A1* | 4/2014 | Jabara | ................ | G07F 17/3218 |
| | | | | 705/14.64 |

* cited by examiner

APPARATUS AND METHOD FOR OPERATING SAME

This application claims priority under 35 U.S.C. § 119 to application no. DE 10 2014 217 865.7, filed on Sep. 8, 2014 in Germany, the disclosure of which is incorporated herein by reference in its entirety.

BACKGROUND

The present invention relates to an apparatus and a method for using an apparatus, which apparatus can be used in particular in an industrial automation process which can be performed by an automation system, for example, but need not necessarily be performed by such a system.

An automation system can comprise at least one apparatus having a machine part/apparatus part, for instance an apparatus such as a screw-fastening tool having a power screwdriver output, a riveting device having a riveting tool, a welding apparatus having a welding gun, a drive control system comprising a servomotor and the like. For safety or liability reasons, only authorized users are allowed to use the functions of the machine parts/apparatus parts. For example, an apprentice is permitted to use a power screwdriver but is not yet authorized to operate a welding apparatus alone, for instance. It is also possible that a department manager is allowed to reconfigure an apparatus in the automation system but a normal technician is permitted to access only the apparatus functions. It may also be the case that only a specific employee at the factory is authorized to perform maintenance on the apparatus in the automation system.

In order to take into account different authorizations of this type in using the apparatus of the automation system, it is necessary to check the authorization of the user of the apparatus before the apparatus is used.

One option for checking the authorization to use the apparatus would be by entering a password at the apparatus. This involves time-consuming password administration, however. In addition, there may be a high rate of errors because passwords are repeatedly forgotten or hacked by third parties, meaning that arrangements to address these problems must be made. Furthermore, recovering a password causes delays in performing the work.

Another possible option as an alternative solution would be to check codes at the apparatus. This would require, for instance, an optical scanner (e.g. for a barcode or matrix code) and a scannable document, however, making it more difficult and more expensive to check an authorization of the user to access the apparatus.

Both options of entering a password or scanning a code are very time-consuming for the apparatus user, however. If the user then also frequently changes position to work at different apparatuses in the automation system, constantly entering or reading the authorization becomes impractical and unacceptable for the user.

SUMMARY

The object of the present invention is therefore to provide an apparatus and a method for using an apparatus that can be used to solve the above-mentioned problems. In particular, an apparatus and a method for using an apparatus shall be provided, in which the functions of the apparatus can be enabled reliably, and in a manner convenient for the user, solely for users authorized for the particular function, and in which the authorization to use the functions can also still be changed easily later.

This object is achieved by an apparatus according to claim 1. The apparatus is suitable in particular for use in an industrial automation process, and has a machine part and/or apparatus part for performing an industrial automation process, and additionally an authentication and access part for authenticating a user of the apparatus and for permitting the user access to at least some of the functions of the machine part if the user has been authenticated, and for blocking the user access to the functions of the machine part if the user has not been authenticated. The invention can generally be used for any apparatus in which user identification prior to using the apparatus is mandatory or can be configured, such as a PC, mobile phone and the like.

Access protection for unauthorized people is implemented extremely advantageously by the apparatus. This can be used to ensure that, if required, use of the functions of the machine part can be prevented by the apparatus.

The apparatus described above allows extremely easy and reliable identification of authorized users, in other words user authentication. Hence simplified user authentication at the apparatus is possible as is ensuring the presence of the authenticated users. Furthermore, the authorization of the user to use different functions of the apparatus can also be changed easily later as required.

The dependent claims define advantageous further embodiments of the apparatus.

The apparatus described above may also comprise a reader for reading data from an access authorization means of the user and for transmitting the data to the authentication and access part for the purpose of authenticating the user of the apparatus. The reader is designed to communicate with the access authorization means using near field communication or far field communication or the like (e.g. WLAN, Bluetooth). The data from the access authorization means can here comprise all the data required for user authentication, or the authentication and access part can additionally be designed to ascertain the access authorization of the user to the functions of the machine part by accessing a database.

According to one exemplary embodiment, the access authorization means of the user may be an identity card containing an NFC chip or RFID tag (RFID=radio frequency identification=identification using electromagnetic ways), wherein the reader may be a scanner for scanning the identity card using near field communication in order to authenticate the user of the apparatus.

According to another exemplary embodiment, the access authorization means of the user may also be an NFC/RFID key of the user, wherein the reader may be a scanner for scanning the key using far field communication in order to authenticate the user of the apparatus.

In another exemplary embodiment, the access authorization means may be a portable part including/excluding telephone functionality (smartphone, tablet PC, handheld PC, notebook), wherein the reader is a scanner for scanning/detecting a communications channel provided by the access authorization means (e.g. access point having SSID). In this example, the scanner works on the basis of WLAN or Bluetooth or a comparable wireless communications means and is hence designed to be compatible with the communications means of the portable part.

In one variant, the authentication and access part can be designed also to check an authorization level of the authenticated user, from which authorization level it is possible to derive those functions of the machine part/apparatus part to which the user has access. For instance, following the above-mentioned scan procedures, data can be exchanged with the access authorization means, which data discloses specific information about the user of the access authorization means. An NFC/RFID chip or key could comprise a data storage device containing user data, the communications channel could disclose itself as such by means of details about the user (for example a user ID as the SSID, for instance the staff number of the user as the SSID). In addition, relevant information could be exchanged after establishing a communications link via the communications channel between apparatus and access authorization means.

According to one exemplary embodiment, the authentication and access part is designed to check, after authenticating a user and enabling at least some of the functions of the machine part, the authentication of a user repeatedly, said authentication and access part being designed to block the functions of the machine part/apparatus part if the repeated check reveals that a user cannot be authenticated or a different user has been authenticated or the user has left the operating range of the reader.

The apparatus described above may be a screw-fastening tool and/or a riveting device and/or a welding apparatus. Other possible apparatuses are drives, controllers and other automation engineering components including pneumatic or hydraulic apparatuses comprising electronic modules, in particular apparatuses requiring authentication of the user.

The object is also achieved by a method according to the method claims for using an apparatus that in particular can be used in an industrial automation process. The apparatus here comprises a machine part/apparatus part for performing an industrial automation process. The method comprises the steps: using an authentication and access part of the apparatus to authenticate a user, and permitting the user access to at least some of the functions of the machine part/apparatus part if the user has been authenticated, or blocking the user access to the functions of the machine part/apparatus part if the user has not been authenticated.

A further method step is checking repeatedly whether an already authenticated user is still located in the near field and/or far field of a reader for reading a user access authorization, which reader is part of the apparatus.

In addition to the above-mentioned method steps, access of the user to the functions of the apparatus part is blocked if the user has not been authenticated or the user has left the near field and/or far field of a reader for reading a user access authorization, which reader is part of the apparatus.

The method achieves the same advantages as those already mentioned with reference to the apparatus. It is also possible to create user groups. The user groups could be administered on a central server to which the apparatus has access. The data on the central server is then incorporated in the process of authenticating a user. If required, a plurality of users from the same user group can also be authenticated at the apparatus at the same time in order to have simultaneous access to apparatus data, for instance. This can be useful during fault analysis, for example if a specialist needs to be consulted from a remote location. Additional mechanisms can be incorporated to ensure that only one of the users can actually operate the apparatus, in particular only that user who is located at the site of the apparatus and in the immediate vicinity of the apparatus.

Further possible implementations of the invention also include combinations of features or embodiments that are described above or below with regard to exemplary embodiments, even if these combinations are not mentioned explicitly. A person skilled in the art will here also add individual aspects as improvements or additions to the relevant basic form of the invention.

BRIEF DESCRIPTION OF THE DRAWINGS

Exemplary embodiments of the disclosure are presented in the drawings an are explained in more detail in the description below.

In the drawings.

DETAILED DESCRIPTION

In the figures, elements that are identical or have the same function are denoted by the same reference signs unless otherwise stated.

Figure 1:
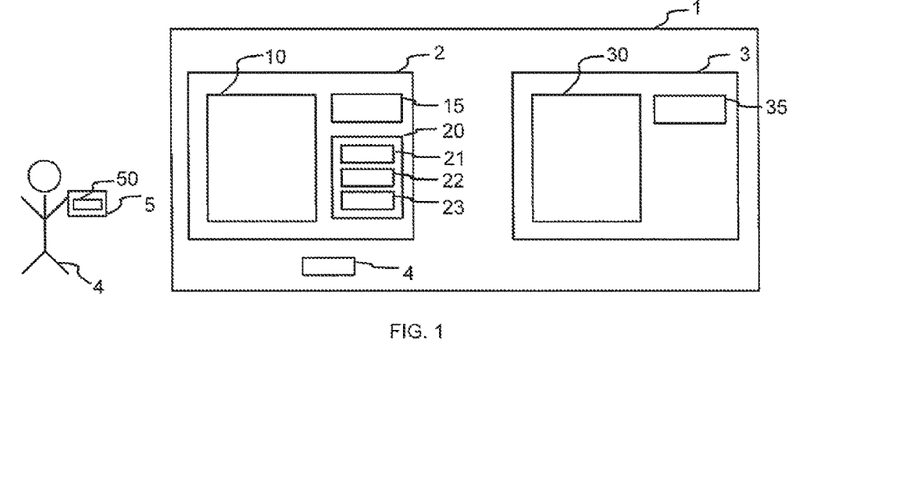
FIG. 1 is a schematic and highly simplified view of an automation system comprising an apparatus according to a first exemplary embodiment.

FIG. 1 shows schematically an automation system 1 according to a first exemplary embodiment. The automation system 1 comprises a first apparatus 2 and a second apparatus 3. The first apparatus 2 and, if applicable, also the second apparatus 3 can process a workpiece 4. The workpiece 4 may be a single component or may also already comprise a plurality of assembled components. In particular, the workpiece 4 may in turn be an apparatus or product. The first apparatus 2 has a machine part and/or apparatus part 10, a controller 15 and an authentication and access part 20, which comprises a reader 21, a database 22 and an indicator device 23. In contrast, the apparatus 3 has only a machine part and/or apparatus part 30 and a controller 35, which controls the functions of the machine part 30.

The automation system 1 may be, for example, a production plant for manufacturing products such as vehicles, furniture, etc. for instance. The apparatus 2 may be a screw-fastening tool and/or a riveting device and/or a punching apparatus and/or a welding apparatus. The apparatus 2, however, may also be a machining tool 2, more generally any electrical apparatus, in particular an electric power tool, having user identification, in general also an apparatus 2 for processing a workpiece or for performing work on a workpiece or even an apparatus (e.g. an electrical drive) for positioning a workpiece. Hence the first apparatus 2 and, if applicable, also the second apparatus 3 may be a tool having a motorized drive for instance. The apparatus 3, however, may also be, for example, a robot, a handling device or the like, which can likewise be used in a process to be performed by the automation system 1. The apparatus 3 is more generally an apparatus that is controlled by the controller 15 or by a higher-level controller (not shown).

In addition to the abovementioned apparatuses 2, hydraulic or pneumatic components having integral electronics, for instance components such as valves, pumps, accumulators, or even control devices and sensors or field devices for automation engineering components, are possible as the apparatus 2.

Said apparatuses 2 can in common all be used by a defined user 4. In order to check the authorization of the user 4 to use the apparatus 2, the user 4 has an access authorization means 5 such as, for example, a company pass or a suitable user card, electronic key and the like. Data 50 required for authenticating the user 4 to use the apparatus 2 is stored on the access authorization means 5.

The machine part/apparatus part 10 can perform, for example, a process to be performed by the automation system 1. The controller 15 controls said performance of the process. Such a process may involve, for instance, screwing in a screw, setting a rivet, punching, welding a welded joint or a spot weld, performing a positioning operation or producing and controlling a hydraulic volumetric flow by means of valves, pumps and the like. Similar principles would be used to control the airflow in a pneumatic system.

The authentication and access part 20 is used for authenticating the user 4 when the user 4 brings his access authorization means 5 into the reading range of the reader 21. The user 4 can do this in particular by inserting the access authorization means 5 into the reader 21 or by holding said means against the reader 21 or placing said means on the reader. If the access authorization means 5 is brought into the reading range of the reader 21, the authentication and access part 20 checks whether the user 4 is authorized to use the apparatus 2 and hence to use the functions of the machine part/apparatus part 10.

Communication between the access authorization means 5 and the reader 21 is by near field communication in the present exemplary embodiment. Near field communication refers to radio-based and contactless data transfer over relatively short distances in the centimeter range, for example up to 12 centimeters. The carrier frequency of the radio signal typically lies in the GHz range here. Data is transferred using an active reader unit, the reader 21, and a passive transponder comprising a data storage device and an antenna. The transponder can be part of the access authorization means 5. The reader unit is coupled to a transponder antenna by magnetic fields generated by the reader unit. The magnetic fields are used to transmit data and to supply the transponder(s) with power. The magnetic field strength can be used to control the range. Alternatively, active transponders having a dedicated power supply can also be used. The transponders may be NFC chips (NFC=near field communication) and/or RFID tags.

For near field communication, the access authorization means 5 and the reader 21 are spaced only short distances apart for radio communication.

More generally, the reader 21 and the access authorization means 5 of the user 4 are designed such that the reader 21 reads the data 50 from the access authorization means 5 or receives the data from the access authorization means 5. For this purpose, the reader 21 can be designed as a scanner, which scans the surrounding area for access authorization means 5, i.e. automatically detects access authorization means in its near field. The reader 21 transfers the data 50 to the authentication and access part 20. The authentication and access part 20 can ascertain from the data 50 whether the user 4 is permitted to use the functions of the machine part 10, and if so which set of functions.

Hence the user 4 can use as the access authorization means 5 either his factory pass or another access card, for instance smartcard, bank card etc., provided said card comprises a transponder. In particular, the user 4 can guide the access authorization means 5 over the apparatus 2 in the region of the reader 21. If the data 50 indicates that the user 4 is authorized to use the functions of the machine part 10, the authentication and access part 20 enables the functions of the apparatus 2 that are permitted to the user 4. In particular, the user 4 may be authorized to perform the automation system process that can be performed by the machine part 10. Another user 4 may be authorized to configure the apparatus 2, for instance when the apparatus is installed for the first time or to change the functions of the apparatus 2. Yet another user 4 may be authorized, for instance, to service the apparatus 2. Other configurations for allocating the authorization groups or authorization levels are also possible however.

Figure 2:
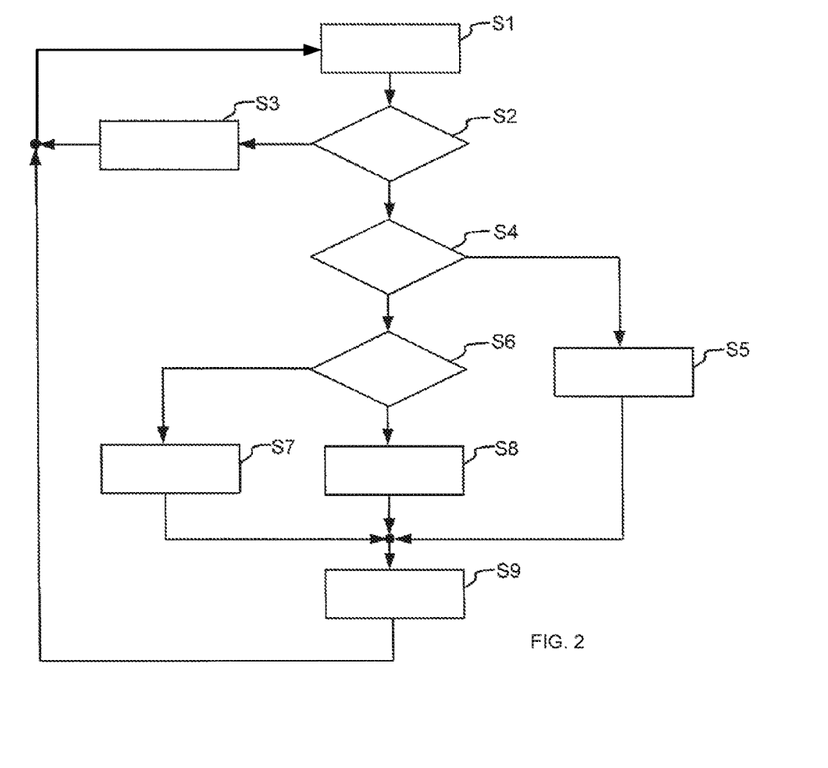
FIG. 2 is a flow diagram of a method for using an apparatus for an automation system according to the first exemplary embodiment.

FIG. 2 shows as an example a method for using the apparatus 2. The method can be implemented by the authentication and access part 20, for example.

After the method is started, the user 4, in a step S1, brings the access authorization means 5 into the reading range of the apparatus 2 in which the reader 21 can read the data 50 from the access authorization means 5. The flow then continues to a step S2.

In the step S2, the reader 21 transmits the data 50 to the authentication and access part 20 so that the authentication and access part 20 can check the data 50. In this check, the authentication and access part 20 ascertains whether or not relevant data on the user 4 is stored in the database 22. If the user 4 is unknown, the flow continues to a step S3. Otherwise, i.e. if the user 4 is authorized to use at least a part of the apparatus 2, the flow proceeds to a step S4.

In the step S3, the authentication and access part 20 continues to block access to the apparatus 2 for the user. In addition, the indicator device 23 indicates that the user 4 is not authorized to access the functions of the apparatus 2. Alternatively or additionally, it can also be indicated that the access authorization means 5 of the user 4 is not suitable for access to the functions of the apparatus 2. These be indications mat be made visually and/or acoustically, for example, in particular by illuminating a red light, sounding a warning signal or the like. The flow then goes back to the step S1.

In the step S4, the authentication and access part 20 ascertains which function(s) of the apparatus 2 the user 5 is permitted to use. If the user 4 is authorized to configure the apparatus 2, the flow continues to a step S5. Otherwise the flow continues to a step S6.

In the step S5, the functions for configuring the apparatus 2 are enabled so that the user 4 can configure from new or reconfigure the apparatus 2. Then the flow continues to a step S9.

In the step S6, a check is made as to whether the user is authorized to use the functions of the machine part 10 and/or to service the apparatus 2. If the user 4 is authorized only to use the functions of the machine part 10, the flow continues to a step S7. Otherwise, if the user is authorized also to service the apparatus 2, the flow continues to a step S8.

In the step S7, the authentication and access part 20 enables only the functions of the machine part 10, so that the user 4 can perform a process to be performed by the automation system 1. For instance the user 4 can now screw in a screw, set a rivet, perform a punching operation, perform a welding operation, operate a valve or perform a positioning operation, or a similar action. The flow then continues to the step S9.

In the step S8, the authentication and access part 20, in addition to enabling the functions of the machine part 10, also enables authorization to service the apparatus 2. Hence for instance, certain information that is relevant to servicing the apparatus 2 can be read out. The flow then continues to the step S9

In the step S9, the authentication and access part 20 blocks the apparatus 2 again from being used by the user 4. This occurs, for instance, when the user 4 has finished work using the apparatus 2. In this case, for example, the user 4 may take the access authorization means 4 out of the reading range of the reader 21 again. Then the flow goes back to the step S1.

The method is finished when the apparatus 2 and/or the automation system 1 is switched off. The steps S3, S6 and S8 may also be dispensed with, for example.

Thus the near field communication can be designed according to the method such that in the step S1 and the step S9, the user 4 holds the access authorization means 5 against the reader 21 or inserts said means into a slot and respectively pulls it out again so that the near field communication can be implemented to enable and block the functions of the apparatus 2. Alternatively, the access authorization means 5 can also remain near the reader 21 for as long as the user 4 is working with the apparatus 2.

In the method, the authentication and access part 20 checks in the steps S4 and S6 an authorization level of the authenticated user 4 for access to the apparatus 2, from which authorization level it is possible to derive, according to steps S5, S7, S8, those functions of the machine part 10 to which the user 4 has access.

The present exemplary embodiment is advantageous particularly in operating a portable apparatus 2, for example, such as a screw-fastening tool, for instance, because the screw-fastening tool is held in the immediate vicinity of the body of the user 4 during operation, sufficient to bridge a gap in the centimeter range, i.e. near field communication.

Other examples of the apparatus 2 may be: a power supply module for electrical drives including/excluding control module for a servomotor, a controller, in particular a welding controller, programmable logic controller (PLC) or a movement controller, an industrial tool for performing work on workpieces or more generally for processing workpieces, in particular (battery-powered) screw-fastening tools, (battery-powered) punching tools, (battery-powered) riveting tools, (battery-powered) crimping tools or hydraulic or pneumatic components or tools that are intended to be operated by a user 4 and can be employed for use in an industrial automation system. Likewise, hydraulic or pneumatic apparatuses such as valves having integral electronics, pumps having integral electronics, control devices, portable or fixed machinery and the like are possible as the apparatuses 2.

Figure 3:
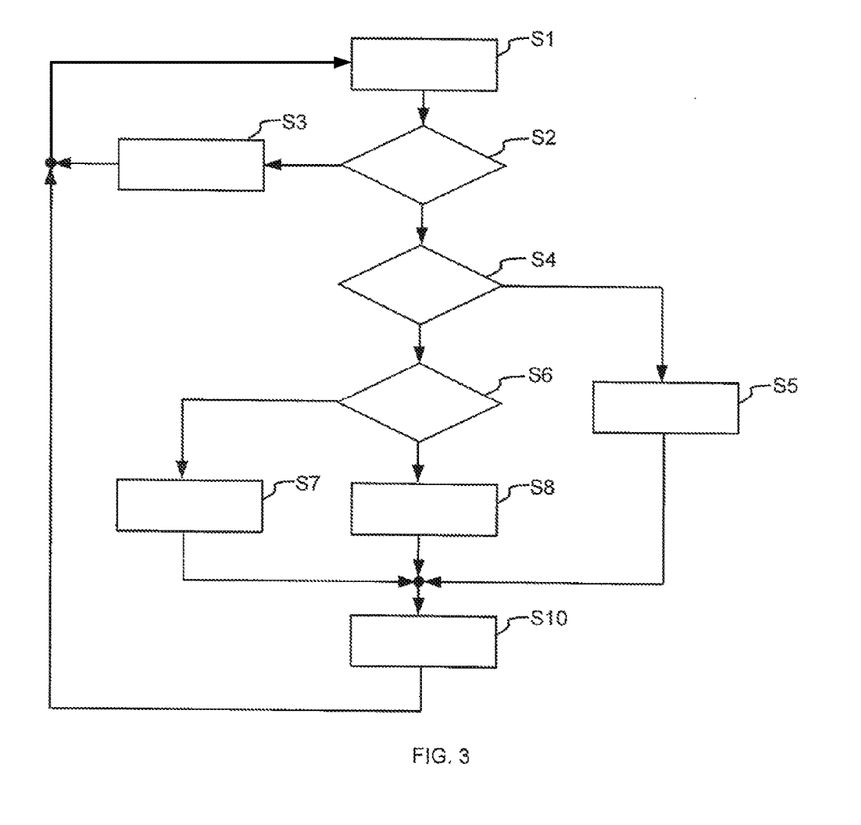
FIG. 3 is a flow diagram of a method for using an apparatus for an automation system according to a second exemplary embodiment.

FIG. 3 shows a flow diagram of a method for using the apparatus 2 according to a second exemplary embodiment. The method according to the present exemplary embodiment is identical to the method according to the first exemplary embodiment except for the step S9 of FIG. 2. Unlike the method according to the first exemplary embodiment, in the method according to the present exemplary embodiment, instead of the step S9 a step S10 is performed after the step S7 or the step S8.

In the step S10, the authentication and access part 20 repeatedly retrieves the data 50 from the access authorization means 5. Repeatedly is understood to mean that an operation is repeated either at identical intervals (periodically) or different intervals, for instance also at randomized intervals or in accordance with a user-definable set of rules or sequence. As long as the access authorization means 5 of the user 4 is present and the data corresponds to the first authentication in the step S2, the apparatus 2 remains operational with the user permissions ascertained in the steps S4 and S6. If, however, the access authorization means 5 is taken out of the reading range of the reader 21, or the authentication and access part 20 detects a different access authorization means 5, the repeated retrieval fails. This results in the authentication and access part 20 switching the apparatus 2 into a default operating mode. Access to the apparatus is thereby blocked for the user 4. If required, this can also be indicated by the indicator device 23.

For the functions of step S10, a slot could be provided on the apparatus 2, into which slot the user 4 can insert his access authorization means 5, in particular his identity card, in order that near field communication can be maintained reliably.

The automation system 1 and the method according to the present exemplary embodiment are otherwise designed and implemented in the same way as described with reference to the first exemplary embodiment.

Figure 4:
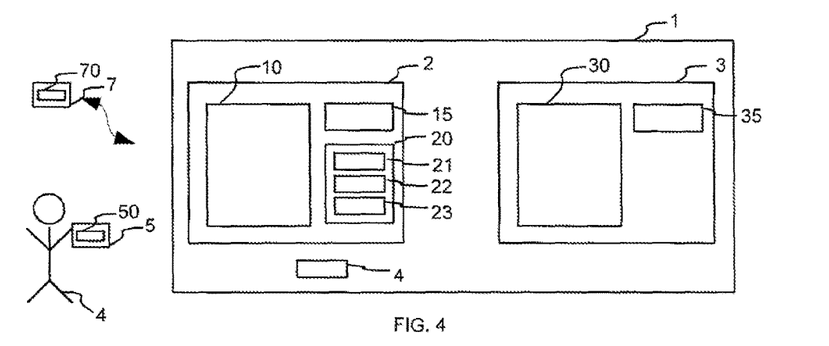
FIG. 4 is a schematic and highly simplified view of an automation system comprising an apparatus according to a third exemplary embodiment.

FIG. 4 shows schematically an automation system 1 according to a third exemplary embodiment. According to the third exemplary embodiment, the access authorization means 5 is designed such that at least some of the data 50, which is required for user identification or user authentication or for ascertaining the user permissions, is obtained from an external databank 7. In this case, the authentication and access part 20 can be designed such that it retrieves the required data 70 from the database 7 wirelessly, for example by WLAN, mobile communications etc.

The automation system 1 and the method are otherwise implemented in the same way as described previously with reference to FIG. 1.

Figure 5:
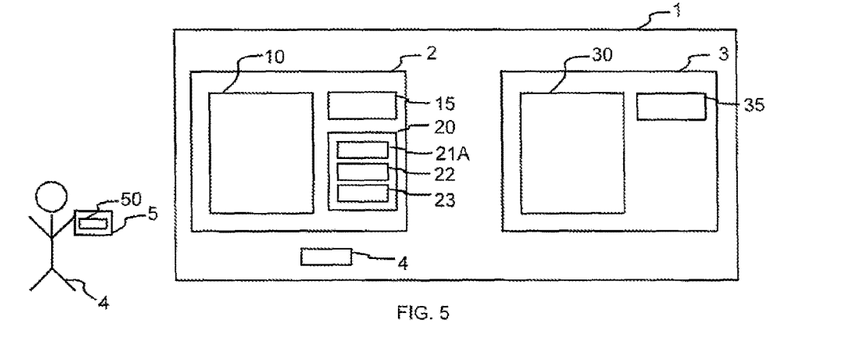
FIG. 5 is a schematic and highly simplified view of an automation system comprising an apparatus according to a fourth exemplary embodiment.

FIG. 5 shows schematically an automation system 1 according to a fourth exemplary embodiment. According to the fourth exemplary embodiment, a reader 21A communicates with the access authorization means 5 in far field communication.

Far field communication refers to radio-based and contactless data transfer at a wavelength that is longer compared with the near field range, for example far field communication can span distances from 35 centimeters up to several meters. The carrier frequency of the radio signal typically lies in the MHz range. Data is transferred using an active reader unit, the reader 21A, and a passive transponder comprising a data storage device and an antenna. In the present exemplary embodiment, the transponder can also be formed by the access authorization means 5. The reader unit is coupled by magnetic fields generated by the reader unit. The magnetic fields are used to transmit data and to supply the transponder(s) with power. The magnetic field strength can be used to control the range. Alternatively, active transponders having a dedicated power supply can also be used. Again in the present exemplary embodiment, the transponders may be NFC chips and/or RFID tags.

Hence it is sufficient for the user 4 to be in the immediate vicinity of the apparatus 2 and to be carrying the access authorization means 5 on his person. The range of the immediate vicinity around the apparatus 2 includes the range required for far field communication and extends up to a range that is the expected range of movement of the user 4 when working with the apparatus 2. The range can therefore lie in a range of up to a few meters but also, for example, up to about 10 m or 20 m.

The reader 21A in this case is embodied as a transceiver, for example an RFID reader/writer having UHF far field antenna (UHF=ultra high frequency). The user 4 carries on his person a key as the access authorization means 5, which key can be detected by the reader 21A, which is in the form of a transceiver. In this case, the access authorization means 5 also preferably comprises a transceiver. The system comprising reader 21A and access authorization means 5 should be designed such that the access authorization means 5 of the user 4 is detected within the usual radius of action of the user 4. As soon as the access authorization means 5 lies inside this radius of action, a user-specific configuration is enabled on the apparatus 2. Again in this case, the apparatus 2 is blocked when the user 4 leaves the radius of action.

Such a configuration according to the present exemplary embodiment has the advantage that the user 4 already on approaching the apparatus 2 is enabled for the apparatus 2 by the user permissions assigned to him, and no further action relating to authentication at the apparatus is required on the part of the user 4. Hence the user 4 can start working with the apparatus 2 immediately. This means there is absolutely no time delay when working with the apparatus 2, and this is even the case when full compliance with the required safety regulations for working with the apparatus 2 is possible.

The present exemplary embodiment is advantageous especially for components that normally lie close to the operator but are not carried immediately on the person of the operator, for example components for operated machines or vehicles.

Figure 6:
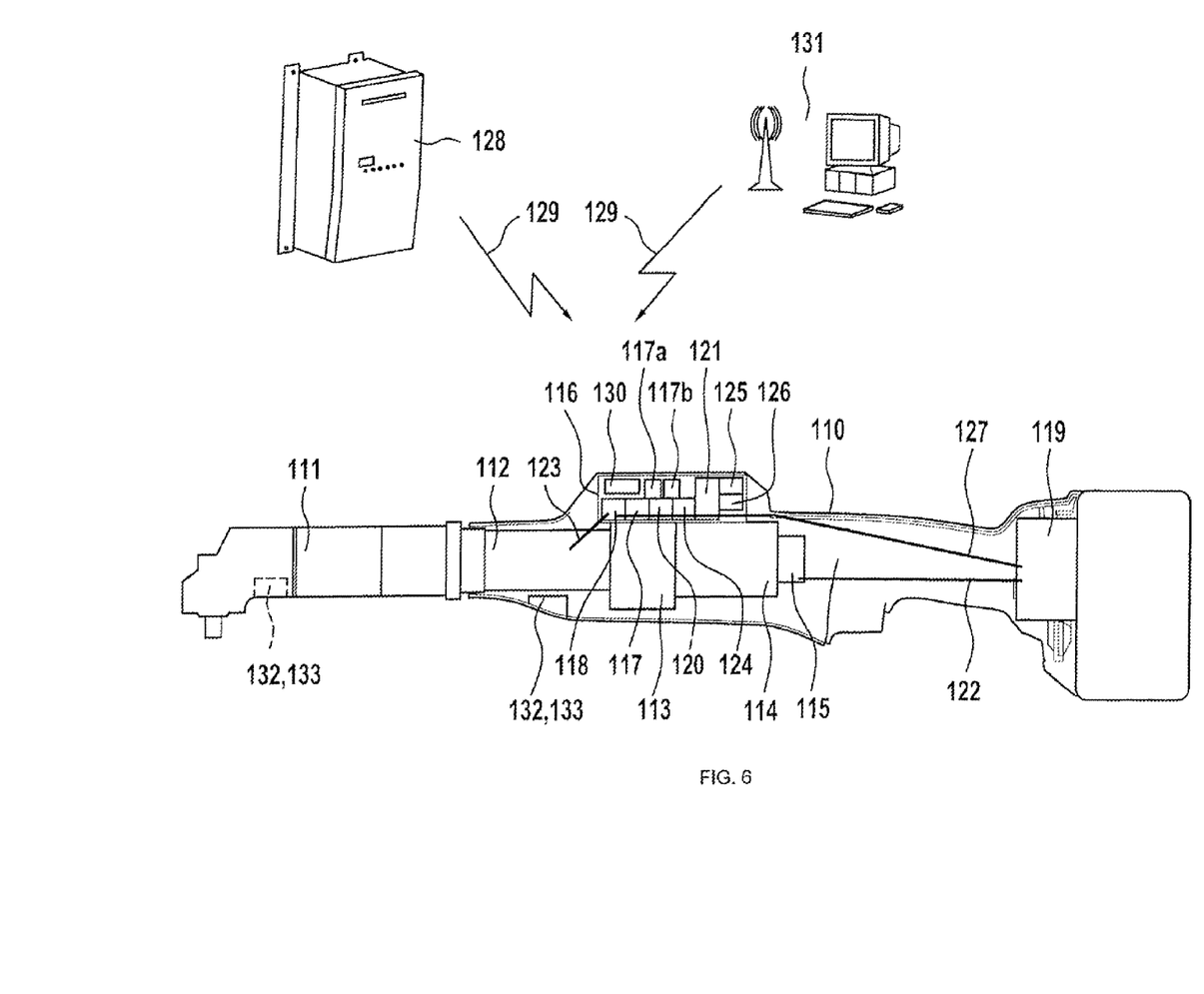
FIG. 6 shows the apparatus according to the invention in the form of a battery-powered screwdriver.

FIG. 6 shows as an example of the apparatus 2 described previously with reference to FIG. 1 to FIG. 5, a screw-fastening tool, which is used to perform screw fastening tasks and is embodied as a handheld screwdriver or fixed screwdriver spindle, and comprises a housing 110. The housing 110 in turn comprises at least one drive output 111 as an apparatus part or machine part, a gear unit 113 and a motor 114, and preferably also a torque sensor 112 and a rotor position encoder 115. The drive output 111 can be driven by the motor 114 and using the gear unit 113. The housing 110 of the screwdriver encloses an integral screw-fastening process control means 116 for performing a fully self-contained screw-fastening process.

By means of the internal control means 116, the screwdriver in FIG. 6 can be operated, at least at times, autonomously and independently of a higher-level screw-fastening process controller 131. The screwdriver can communicate with the higher-level screw-fastening process controller 131 or even with other devices 128 by radio 129 (e.g. access point/route) and can exchange data (screw-fastening program, results data and the like) with these devices 131, 128. The screw-fastening process control means 116 comprises as components at least one microprocessor 117, having memory 117a or a memory receptacle 117b, and preferably also a measuring module 118 and a servo amplifier 119. The input of the measuring module 118 is connected 123 to the output of the torque sensor 112. The servo amplifier 119 is connected to the rotor position encoder 115 by a connection 122, and to the measuring module 118 by a further, separate connection 127. The connection 127 is a data bus, which allows intercommunication between the components 117, 118, 119, 120.

In the apparatus of FIG. 6, a screw-fastening program that can be executed by the microprocessor 117 can be used to control the motor 114 using the rotor position and the output data from the torque sensor 112. The microprocessor 117 reads the screw-fastening program from the memory 117a or from a flash memory card inserted in the memory receptacle 117b. As further included components, input/output units 120 implement a Human Machine Interface (e.g. between screwdriver and operator, for instance the user 4 described above, by means of keyboard and display) and/or a Machine Interface (e.g. between screwdriver and PC by means of data interfaces) preferably including visualization of data relevant to the screw-fastening process (e.g. by means of a color display 124) for the user.

An image acquisition means 132 can optionally be arranged close to the drive output 111 or immediately on the drive output 111, or an arrangement 133 can be provided for mechanical and/or electrical connection of an aforesaid image acquisition means 132. The screw-fastening process control means 116 can in this case simultaneously perform the function of image processing/image analysis 130.

This exemplary apparatus includes all the details necessary for implementing safety-critical screw-fastenings such as storing results, outputting results and documenting results. An integral transmitter 121 can transmit the screw-fastening data by radio 129 to a receiving station 128, 131, for example incorporating an access point. If a temporary radio shadow occurs, the integral electronics buffers the data in the screwdriver of FIG. 6 and outputs it as soon as a radio connection 129 is restored. This ensures 100% documentation of all events and ensures high availability, and is a decisive factor in process reliability.

An electronic control and power electronics module that is fully integrated in the screwdriver of FIG. 6 effectively dispenses with distribution amongst a plurality of individual components connected via power leads and communications cables. A color display 124 is provided on the screwdriver for the purpose of parameterization and information for worker, operator or user. An integral high-power LED ensures constantly optimum illumination of the screw-fastening position even in changing light conditions. The result of the screw fastening just made by the spindle can be inferred from the colored background to the display indicator (e.g. red/green). The invention reaches torques of up to 50 Nm, and lithium-ion rechargeable batteries ensure reliable operation. The image information generated by the image acquisition means 132, 133, and the additional image information provided by the screw-fastening process control means 116 or a higher-level device 128, 131 can also be shown on the display 124. Optional audio devices (microphone input, loudspeaker output and/or microphone or loudspeaker) 126 and/or a Bluetooth module 125 for audio data transmission can connect the operator of the work tool acoustically to a higher-level device 128, 131.

In addition, this screw-fastening tool comprises at least some of the features according to the invention, as disclosed in the claims, such as, for example, a near field reader and/or a far field reader and an authentication and/or access means, which means coordinates user access according to the invention. Said tool likewise includes at least some of the means for implementing the method steps disclosed in the claims.

Depending on the application, the screw-fastening tool can also be designed without image acquisition/audio transmission etc.; specified apparatus features can likewise also be omitted or replaced by features that are not mentioned here, provided that the remaining features still achieve the object intended for the apparatus.

Figure 7:
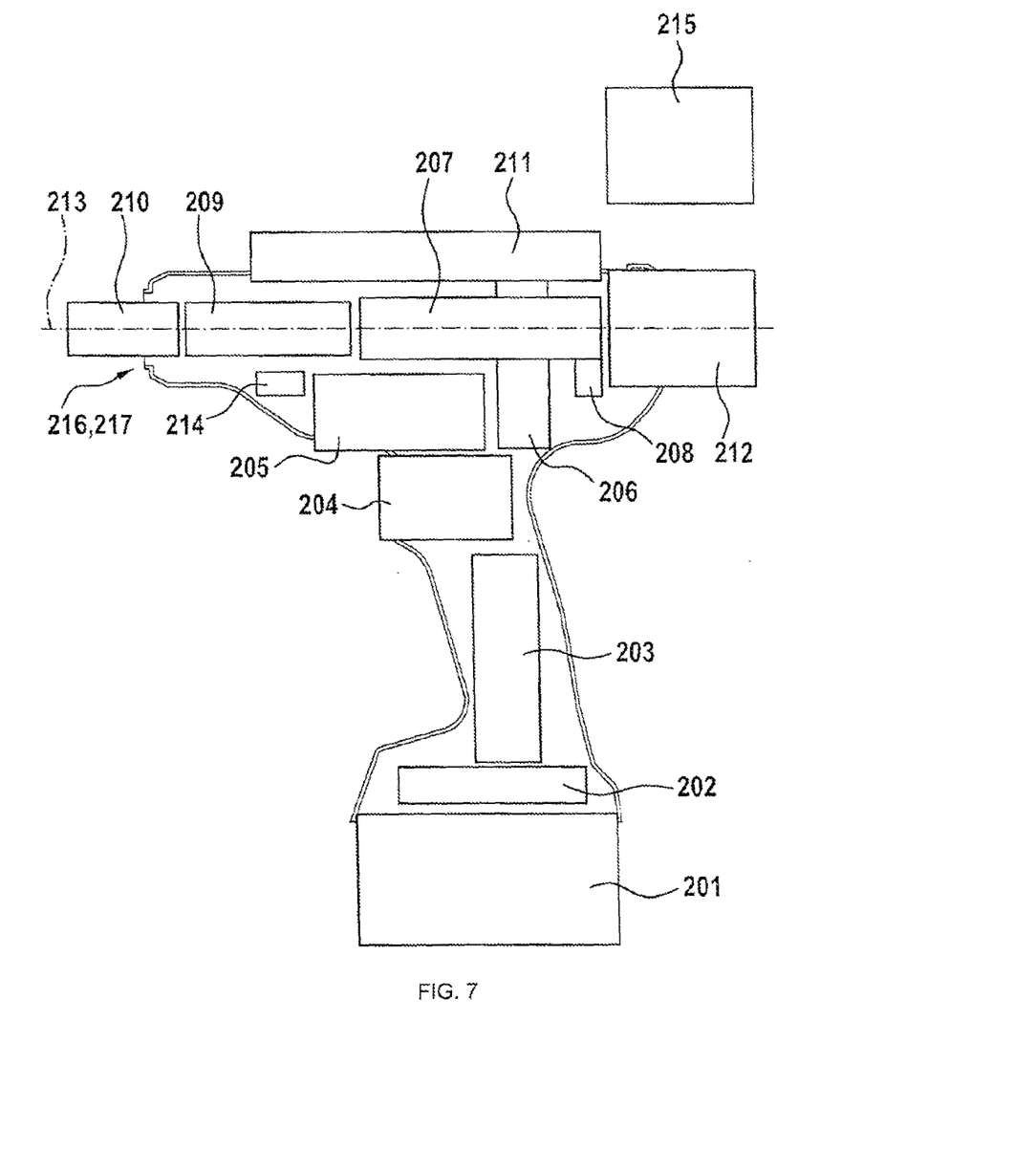
FIG. 7 shows the apparatus according to the invention in the form of a battery-powered riveting device.

The apparatus shown in FIG. 7 represents another example of the apparatus 2 described previously with reference to FIG. 1 to FIG. 5, and is used for performing press-insertion tasks. It is designed as a riveting tool or as a rivet-setting tool, which is used for setting blind rivets, consisting of a rivet sleeve and a snap-off mandrel, or blind rivet nuts. It is a battery-powered apparatus for handheld operation. An apparatus head 210 having nozzle for holding the mandrel is provided. Arranged adjacent to one another along the same axis 213 are the apparatus head 210 and/or a load cell having mandrel feedthrough 209 and/or a trapezoidal lead screw or ball screw 207 having mandrel feedthrough and/or preferably a spent mandrel container 212. Hence the mandrel held by the nozzle during assembly, after being snapped off can be carried through the above-mentioned components 210, 209, 207 to the spent mandrel container 212. The trapezoidal lead screw or ball screw 207 is driven by an electric motor 205, preferably in conjunction with a gear unit 206, if applicable with offset. A displacement sensor 208 is arranged on the trapezoidal lead screw or ball screw 207, which sensor can measure directly, or indirectly by means of the angle through which the trapezoidal lead screw or ball screw 207 has rotated, the distance travelled by the trapezoidal lead screw or ball screw 207. Alternatively, the displacement sensor 208 could also be arranged on the motor 205. Reference sign 211 denotes an electronic control unit having communications module and display, which unit may be encompassed at least partially also by the housing. The spent rivet container 212 can also be encompassed at least partially just by the housing.

The electrical supply for the whole of the aforesaid arrangement according to FIG. 7 is provided by a rechargeable battery 201, for which a cable harness 203 is provided. The start switch 204 is used for switching on and off. Reference sign 202 denotes the interface between rechargeable battery and power electronics for controlling the motor 205. At least the components 202, 203, 205, 206, 207, 208, 209 and preferably also the component 211 are fully enclosed by the housing of the rivet-setting tool. The electronic control unit 211 is equipped with a data storage device and is connected to the sensors 208, 209 in such a way that it can store in the data storage device and/or analyze the set of data continuously supplied by the sensors 208, 209 during a setting operation.

The rivet-setting tool shown in FIG. 7 preferably comprises a radio module 214, preferably a WLAN module and/or mobile communications module (GSM/G3/G4), for wireless transmission of process data or stored data to a high level controller 215. Both modules could also be activated alternately, for example according to the signal quality and the link to data networks. Process data refers to continuous data streams which are generated by the force and displacement sensors during the operation of setting blind rivets or blind rivet nuts, and hence constitutes data that characterizes a specific setting operation, one use of which is to allow a quality analysis (force/displacement data). A quality analysis of this type, using reference data records (force/displacement data), can be performed either by the internal electronic control unit 211 and/or by a higher-level device 215. The same applies to the image processing and the associated image data.

Hence in addition to showing the user pure OK/NOK information (NOK=not OK) in the display of the integral apparatus electronic control unit 211 of FIG. 7, it is also possible to show force/displacement curves or analysis results based on these curves. The higher-level device 215 uses an external display for this purpose. Such analyses then permit evaluation of the force/displacement graphs of each individual riveted joint that was made in a production line.

The rivet-setting tool can comprise an image acquisition means 216 or an arrangement 217 for mechanical and/or electrical connection of an image acquisition means 216. The electronic control unit 211 can in this case simultaneously perform the function of image processing/image analysis; alternatively this is handled by the higher-level device 215, which can communicate with the rivet-setting tool by radio.

In addition, the rivet-setting tool comprises at least some of the features according to the invention, as disclosed in the claims, such as, for example, a near field reader and/or far field reader and an authentication and/or access means, which means coordinates user access according to the invention. Said tool likewise includes at least some of the means for implementing the method steps disclosed in the claims.

Depending on the application, the rivet-setting tool can also be designed without image acquisition/audio transmission etc.; specified apparatus features can likewise also be omitted or replaced by features that are not mentioned here, provided that the remaining features still achieve the object intended for the apparatus.

Figure 8:
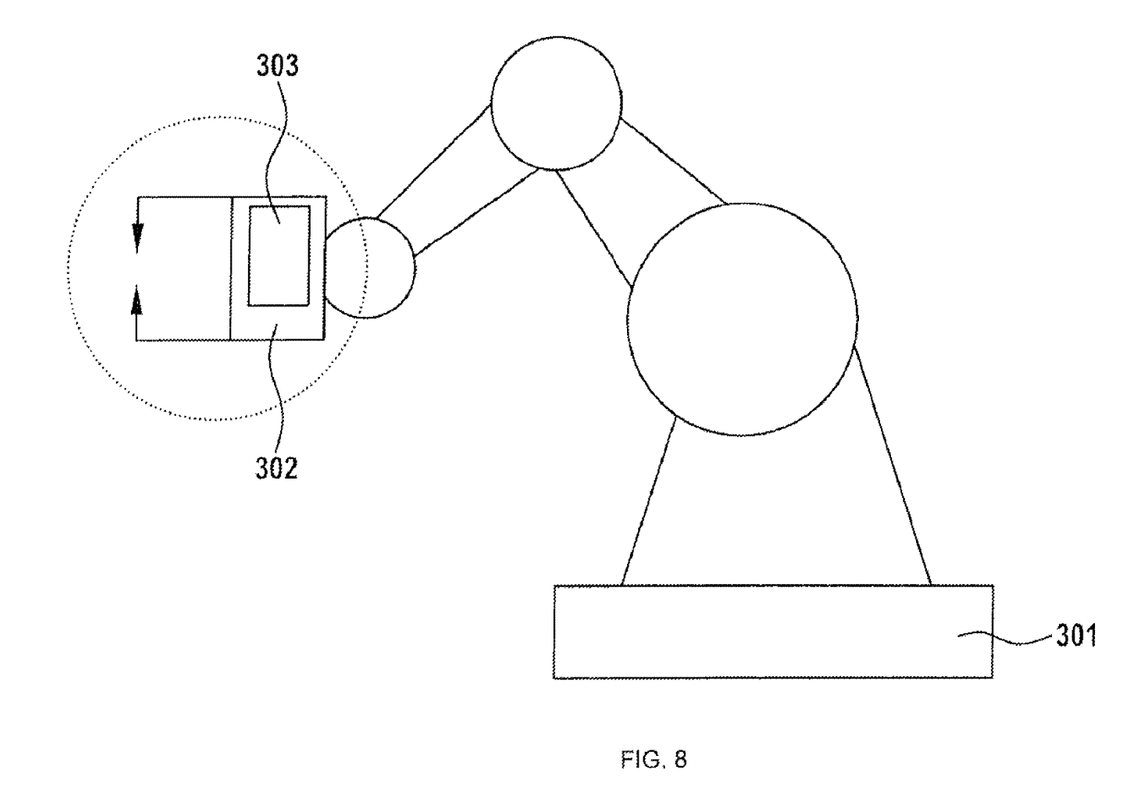
FIG. 8 shows the apparatus according to the invention in the form of a welding apparatus.

The apparatus shown in FIG. 8, which is another example of the apparatus 2 described previously with reference to FIG. 1 to FIG. 5, is a welding robot 301 or a welding apparatus and is used for creating a welded joint by means of a welding gun 302. An image acquisition means 303 or a corresponding recording device for such an image acquisition means 303 can be integrated in the welding gun 302, which is mounted by an articulated joint on the swivel-mounted arm of the robot and experiences every movement of the arm. The welding controller (not shown) can comprise the image processing means.

Depending on the application, the welding apparatus can also be designed without image acquisition/audio transmission etc.; specified apparatus features can likewise also be omitted or replaced by features that are not mentioned here, provided that the remaining features still achieve the object intended for the apparatus.

In addition, the welding apparatus, robot 301 or the welding gun 302 or other components comprise at least some of the features according to the invention, as disclosed in the claims, such as, for example, a near field reader and/or far field reader and an authentication and/or access means, which means coordinates user access according to the invention. Likewise included are at least some of the means for implementing the method steps disclosed in the claims.

The parts shown in all the figures are represented schematically and may differ in terms of the precise design from the forms shown in the figures, provided the previously described functions of these parts are maintained.

In addition, other apparatuses or components thereof that are not shown explicitly here may comprise at least some of the features according to the invention, as disclosed in the claims, such as, for example, a near field reader and/or far field reader and an authentication and/or access means, which means coordinates user access according to the invention. Said apparatuses or components thereof likewise include at least some of the means for implementing the method steps disclosed in the claims.

With regard to selecting near field communication and/or far field communication, the apparatus 2, in all examples shown, can itself also in turn comprise parameters that can be used, for example by a suitably trained user 4, to configure the individual on-site communication situation. For instance, the apparatus 2 can comprise means for implementing near field communication and/or far field communication, which can be selected during basic parameterization and the radio range of which can be set by configurable radio module parameters.

Another possibility would be that said radio modules of the apparatuses 2 provide a plurality of radio channels that can be selected for a user 4, so that, for instance, a plurality of apparatuses 2 arranged in the immediate vicinity of one another do not cause mutual interference or affect one another.

Another possibility would be that the reader unit in the form of the reader 21 and/or the reader 21A is able to write to a memory that is part of the transponder, the access authorization means 5. Thus information specific to this user 4 could be stored on the transponder during a work session, for example.

The specific information may be, for example, the user-specific time period for which the apparatus 2 is switched on, or other information that characterizes the work carried out. The data on the transponder of the user 4 could be read out by the apparatus 2, for instance when next in contact, and taken into account in subsequent work, or this data could be recorded and analyzed centrally. It would then be possible to ascertain, for instance, which user 4 has performed what work using which apparatuses 2, and in what time period and/or at what point in time this took place.

The automation system 1 can also comprise just a first apparatus 2 and hence no second apparatus 3. Alternatively the automation system 1 can comprise also first and second apparatuses 2, 3. It is also possible that there are a plurality of first apparatuses 2 in the automation system 1.

The database 22 may be a database that is part of the apparatus 2, 3 itself. The database 22, however, might also be part of the controller 15. The database 22 can also exist on a central server to which the apparatus 2, 3 has a temporary or permanent communications link. In particular, the reader 21 and/or the database 22 and/or the indicator device 23 can also be provided separately from the authentication and access part 20 or from the apparatus 2, 3. The authentication and access part 20 can also be part of the controller 15.

What is claimed is:

1. An apparatus comprising: an machine part comprising one of a screwdriver or a riveter configured to operate in an automation system; a reader configured to read data from an access authorization device of a user and to transmit the data to the authentication and access part, the reader further comprising a wireless transceiver configured to communicate with the access authorization device only when the access authorization device is located within a predetermined radius of action for the user of the machine part; and an authentication and access part configured to: perform an initial authentication of a user of the apparatus based on the data read from the access authorization device using the reader; permit the user to access at least some functions of the machine part only in response to success of the initial authentication upon movement of the access authorization device to within the predetermined radius of action for use of the machine part to enable a configuration of the machine part that corresponds to the user associated with the access authorization device; block the user from accessing to the functions of the machine part in response to failure of the initial authentication; and repeatedly read the data from the access authorization device after the initial authentication to reconfirm the authentication and permit the user to continue access to the at least some functions of the machine only in response to reconfirmation of the authentication, wherein movement of the access authorization device beyond the predetermined radius of action prevents reconfirmation of the authentication.

2. The apparatus according to claim 1, the authentication and access part being further configured to: access a database that is at least one of external to the apparatus and internal to the apparatus to ascertain an access authorization of the user to the functions of the machine part.

3. The apparatus according to claim 1, the reader being further configured to: detect a communications channel provided by the access authorization device; and establish a communications link with the access authorization device via the communications channel.

4. The apparatus according to claim 1, the authentication and access part being further configured to: check an authorization level of the user if the user has been authenticated, the authorization level indicating which of the functions of the machine part the user has access to.

5. The apparatus according to claim 1, the authentication and access part being further configured to: block the user from accessing to the functions of the machine part if the repeated check reveals at least one of (i) that the user cannot be authenticated, (ii) that a different user has been authenticated, and (iii) that the access authorization device does not respond to signals transmitted by the reader.

6. A method for using or operating an apparatus comprising: reading, with a reader in the apparatus, data from an access authorization device of a user using a wireless transceiver in the reader configured to communicate with the access authorization device only when the access authorization device is located within a predetermined radius of action for the user of a machine part; transmitting, with the reader, the data from the access authorization device to an authentication and access part in the apparatus; performing, with the authentication and access part, an initial authentication of the user of the apparatus based on the data read from the access authorization device using the reader; permitting the user to access at least some functions of the machine part only in response to success of the initial authentication upon movement of the access authorization device within the predetermined radius of action for use of the machine part to enable a configuration of the machine part that corresponds to the user associated with the access authorization device, wherein the at least some functions comprise operation of one of a screwdriver or a riveter in an automation system; blocking the user from accessing to the functions of the machine part in response to failure of the initial authentication; and repeatedly reading the data from the access authorization device with the reader after the initial authentication to reconfirm the authentication and permitting the user to continue access to the at least some functions of the machine only in response to reconfirmation of the authentication, wherein movement of the access authorization device beyond the predetermined radius of action prevents reconfirmation of the authentication.

7. The method according to any of claim 6, comprising blocking the user from accessing to the functions of the machine part if at least one of (i) the user has not been authenticated, (ii) the access authorization device fails to respond to signals transmitted by the reader, and (iii) a different user has been authenticated.

8. The method according to claim 6 further comprising: receiving, with the reader, a service set identifier (SSID) of a communications channel between the reader and the access authorization device to determine if the authorization device continues to respond to signals transmitted by the reader.

* * * * *